US008259369B2

(12) United States Patent
Klassen

(10) Patent No.: US 8,259,369 B2
(45) Date of Patent: Sep. 4, 2012

(54) COLOR CHARACTERIZATION OR CALIBRATION TARGETS WITH NOISE-DEPENDENT PATCH SIZE OR NUMBER

(75) Inventor: R. Victor Klassen, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 942 days.

(21) Appl. No.: 11/170,873

(22) Filed: Jun. 30, 2005

(65) Prior Publication Data
US 2007/0002344 A1 Jan. 4, 2007

(51) Int. Cl.
*H04N 1/46* (2006.01)
(52) U.S. Cl. ......... 358/504; 358/406; 358/518; 358/520
(58) Field of Classification Search .................. 358/1.1, 358/1.9, 504, 505, 406, 518, 520; 382/162
See application file for complete search history.

(56) References Cited

U.S. PATENT DOCUMENTS

| | | | |
|---|---|---|---|
| 4,473,298 A | 9/1984 | Sakamoto |
| 4,516,175 A | 5/1985 | Jung et al. |
| 4,579,446 A | 4/1986 | Fujino et al. |
| 4,587,532 A | 5/1986 | Asano |
| 4,836,119 A | 6/1989 | Siraco et al. |
| 5,004,222 A | 4/1991 | Dobashi |
| 5,080,340 A | 1/1992 | Hacknauer et al. |
| 5,095,342 A | 3/1992 | Farrell et al. |
| 5,159,395 A | 10/1992 | Farrell et al. |
| 5,208,640 A | 5/1993 | Horie et al. |
| 5,272,511 A | 12/1993 | Conrad et al. |
| 5,326,093 A | 7/1994 | Sollitt |
| 5,435,544 A | 7/1995 | Mandel |
| 5,473,419 A | 12/1995 | Russel et al. |
| 5,489,969 A | 2/1996 | Soler et al. |
| 5,504,568 A | 4/1996 | Saraswat et al. |
| 5,525,031 A | 6/1996 | Fox |
| 5,557,367 A | 9/1996 | Yang et al. |
| 5,568,246 A | 10/1996 | Keller et al. |
| 5,570,172 A | 10/1996 | Acquaviva |
| 5,596,416 A | 1/1997 | Barry et al. |
| 5,629,762 A | 5/1997 | Mahoney et al. |
| 5,710,968 A | 1/1998 | Clark et al. |
| 5,748,330 A | 5/1998 | Wang et al. |
| 5,778,377 A | 7/1998 | Marlin et al. |
| 5,784,667 A | 7/1998 | Mestha et al. |
| 5,790,281 A | 8/1998 | Knox et al. |
| 5,884,910 A | 3/1999 | Mandel |
| 5,995,721 A | 11/1999 | Rourke et al. |
| 6,059,284 A | 5/2000 | Wolf et al. |
| 6,125,248 A | 9/2000 | Moser |
| 6,241,242 B1 | 6/2001 | Munro |

(Continued)

OTHER PUBLICATIONS

Keith Knox, "Integrating Cavity Effect in Scanners," Proceedings on IS&T/OSA Conference on Optics and Imaging in the Information Age, Rochester, pp. 156-158 (1996).

(Continued)

*Primary Examiner* — King Poon
*Assistant Examiner* — Lawrence Wills
(74) *Attorney, Agent, or Firm* — Fay Sharpe LLP

(57) ABSTRACT

A calibration or characterization system is provided wherein the number of repeated patches or the size of a patch of a given color is printed to be approximately proportional to the square of the expected noise level. In that way, when multiple measurements for a given patch are averaged, all patch averages have approximately the same reliability.

21 Claims, 7 Drawing Sheets

U.S. PATENT DOCUMENTS

| | | | |
|---|---|---|---|
| 6,297,886 B1 | 10/2001 | Cornell | |
| 6,341,773 B1 | 1/2002 | Aprato et al. | |
| 6,345,117 B2 | 2/2002 | Klassen | |
| 6,381,037 B1* | 4/2002 | Balasubramanian et al. | 358/3.23 |
| 6,384,918 B1 | 5/2002 | Hubble, III et al. | |
| 6,441,923 B1 | 8/2002 | Balasubramanian et al. | |
| 6,450,711 B1 | 9/2002 | Conrow | |
| 6,476,376 B1 | 11/2002 | Biegelsen et al. | |
| 6,476,923 B1 | 11/2002 | Cornell | |
| 6,493,098 B1 | 12/2002 | Cornell | |
| 6,537,910 B1 | 3/2003 | Burke et al. | |
| 6,550,762 B2 | 4/2003 | Stoll | |
| 6,554,276 B2 | 4/2003 | Jackson et al. | |
| 6,577,925 B1 | 6/2003 | Fromherz | |
| 6,607,320 B2 | 8/2003 | Bobrow et al. | |
| 6,608,988 B2 | 8/2003 | Conrow | |
| 6,612,566 B2 | 9/2003 | Stoll | |
| 6,612,571 B2 | 9/2003 | Rider | |
| 6,621,576 B2 | 9/2003 | Tandon et al. | |
| 6,633,382 B2 | 10/2003 | Hubble, III et al. | |
| 6,639,669 B2 | 10/2003 | Hubble, III et al. | |
| 6,760,056 B2 | 7/2004 | Klassen et al. | |
| 6,775,029 B1 | 8/2004 | Wen et al. | |
| 6,819,352 B2* | 11/2004 | Mizes et al. | 347/240 |
| 6,819,906 B1 | 11/2004 | Herrmann et al. | |
| 6,925,283 B1 | 8/2005 | Mandel et al. | |
| 6,959,165 B2 | 10/2005 | Mandel et al. | |
| 8,125,694 B2* | 2/2012 | Matsuzawa | 358/504 |
| 2001/0033686 A1 | 10/2001 | Klassen | |
| 2002/0067849 A1 | 6/2002 | Klassen et al. | |
| 2002/0078012 A1 | 6/2002 | Ryan et al. | |
| 2002/0103559 A1 | 8/2002 | Gartstein | |
| 2003/0063302 A1 | 4/2003 | Munger et al. | |
| 2003/0077095 A1 | 4/2003 | Conrow | |
| 2004/0085561 A1 | 5/2004 | Fromherz | |
| 2004/0085562 A1 | 5/2004 | Fromherz | |
| 2004/0088207 A1 | 5/2004 | Fromherz | |
| 2004/0136015 A1 | 7/2004 | Van de Capelle et al. | |
| 2004/0150156 A1 | 8/2004 | Fromherz et al. | |
| 2004/0150158 A1 | 8/2004 | Biegelsen et al. | |
| 2004/0153983 A1 | 8/2004 | McMillan | |
| 2004/0165199 A1 | 8/2004 | Klassen et al. | |
| 2004/0216002 A1 | 10/2004 | Fromherz et al. | |
| 2004/0225391 A1 | 11/2004 | Fromherz et al. | |
| 2004/0225394 A1 | 11/2004 | Fromherz et al. | |
| 2004/0246528 A1 | 12/2004 | Washio et al. | |
| 2004/0247365 A1 | 12/2004 | Lofthus et al. | |
| 2004/0252905 A1 | 12/2004 | Mizes et al. | |
| 2004/0257595 A1 | 12/2004 | Sharma et al. | |
| 2004/0264768 A1 | 12/2004 | Sharma et al. | |
| 2004/0264769 A1 | 12/2004 | Sharma et al. | |
| 2004/0264770 A1 | 12/2004 | Sharma et al. | |
| 2004/0264771 A1 | 12/2004 | Sharma et al. | |
| 2005/0036159 A1 | 2/2005 | Sharma et al. | |

OTHER PUBLICATIONS

G. Sharma, S. Wang, D. Sidavanahalli and K. Knox, "The Impact of UCR on Scanner Calibration," in Proc PICS Conf., pp. 121-124, Portland, OR (1998).

V. Ostromoukhov, R.D. Hersch, C. Peraire, P. Emmel and I. Amidror, "Two Approaches in Scanner-Printer Calibration: Colorimetric Space-Based vs. Closed-Loop," in Proc SPIE 2170, pp. 133-142 (1994).

J. Hardeberg, "Desktop Scanning to sRGB," in IS&T and SPIE's Device Independent Color, Color Hardcopy and Graphic Arts V, San Jose, CA (Jan. 2000).

H. Haneishi, T. Hirao, A. Shimazu and Y. Miyake, "Colorimetric Precision in Scanner Calibration Using Matrices," in Proceedings of IS&T and SID's 3$^{rd}$ Color Imaging Conference: Color Science, Systems and Applications, pp. 106-108, Scottsdale, Arizona (Nov. 1995).

A.R. Rao, "Color Calibration of a Colorimetric Scanner Using Non-Linear Least Squares," in Proc. IS&T's 1998 PICS Conference, Portland, OR (May 1998).

U.S. Appl. No. 10/945,600, filed Sep. 20, 2004, Yao.
U.S. Appl. No. 11/143,818, filed Jun. 2, 2005, Dalal et al.
U.S. Appl. No. 11/146,665, filed Jun. 7, 2005, Mongeon.
U.S. Appl. No. 11/152,275, filed Jun. 14, 2005, Roof et al.
U.S. Appl. No. 11/156,778, filed Jun. 20, 2005, Swift.
U.S. Appl. No. 11/157,598, filed Jun. 21, 2005, Frankel.
U.S. Appl. No. 11/166,299, filed Jun. 25, 2005, Moore.
U.S. Appl. No. 11/166,460, filed Jun. 24, 2005, Roof et al.
U.S. Appl. No. 11/166,581, filed Jun. 24, 2005, Lang et al.
U.S. Appl. No. 11/170,845, filed Jun. 30, 2005, Sampath et al.
U.S. Appl. No. 11/189,371, filed Jul. 26, 2006, Moore et al.
U.S. Appl. No. 11/208,871, filed Aug. 22, 2005, Dalal et al.
U.S. Appl. No. 11/212,367, filed Aug. 26, 2005, Anderson et al.
U.S. Appl. No. 11/215,791, filed Aug. 30, 2005, Hamby et al.
U.S. Appl. No. 11/222,260, filed Sep. 8, 2005, Goodman et al.
U.S. Appl. No. 11/234,468, filed Sep. 23, 2005, Hamby et al.
U.S. Appl. No. 11/234,553, filed Sep. 23, 2005, Mongeon.
U.S. Appl. No. 11/235,979, filed Sep. 27, 2005, Anderson et al.
U.S. Appl. No. 11/236,099, filed Sep. 27, 2005, Anderson et al.
U.S. Appl. No. 11/247,778, filed Oct. 11, 2005, Radulski et al.
U.S. Appl. No. 11/248,044, filed Oct. 12, 2005, Spencer et al.
U.S. Appl. No. 11/268,294, filed Nov. 4, 2005, Klassen.
U.S. Appl. No. 11/274,638, filed Nov. 15, 2005, Wu et al.
J. Hardeberg, "Acquisition and Reproduction of Colour Images: Colorimetric and Multispectral Approaches," Doctoral Dissertation, l'Ecole Nationale Superieure des Telecommunications, Paris (1999).
U.S. Appl. No. 11/287,177, filed Nov. 23, 2005, Mandel et al.
U.S. Appl. No. 11/291,860, filed Nov. 30, 2005, Willis.
U.S. Appl. No. 11/292,163, filed Nov. 30, 2005, Mandel et al.
U.S. Appl. No. 11/292,388, filed Nov. 30, 2005, Mueller.
U.S. Appl. No. 11/314,774, filed Dec. 21, 2005, Klassen.
U.S. Appl. No. 11/315,045, filed Dec. 22, 2005, Klassen.
U.S. Appl. No. 11/593,410, filed Nov. 6, 2006, Klassen.
U.S. Appl. No. 11/170,975, filed Jun. 30, 2005, Klassen.
Morgan, P.F., "Integration of Black Only and Color Printers", Xerox Disclosure Journal, vol. 16, No. 6, Nov./Dec. 1991, pp. 381-383.
Desmond Fretz, "Cluster Printing Solution Announced", Today at Xerox (TAX), No. 1129, Aug. 3, 2001.
U.S. Appl. No. 10/761,522, filed Jan. 21, 2004, Mandel, et al.
U.S. Appl. No. 10/785,211, filed Feb. 24, 2004, Lofthus, et al.
U.S. Appl. No. 10/881,619, filed Jun. 30, 2004, Bobrow.
U.S. Appl. No. 10/917,676, filed Aug. 13, 2004, Lofthus, et al.
U.S. Appl. No. 10/917,768, filed Aug. 13, 2004 Lofthus, et al.
U.S. Appl. No. 10/924,106, filed Aug. 23, 2004, Lofthus, et al.
U.S. Appl. No. 10/924,113, filed Aug. 23, 2004, deJong, et al.
U.S. Appl. No. 10/924,458, filed Aug. 23, 2004, Lofthus, et al.
U.S. Appl. No. 10/924,459, filed Aug. 23, 2004, Mandel, et al.
U.S. Appl. No. 10/933,556, filed Sep. 3, 2004, Spencer, et al.
U.S. Appl. No. 10/953,953, filed Sep. 29, 2004, Radulski, et al.
U.S. Appl. No. 10/999,326, filed Nov. 30, 2004, Grace, et al.
U.S. Appl. No. 10/999,450, filed Nov. 30, 2004, Lofthus, et al.
U.S. Appl. No. 11/000,158, filed Nov. 30, 2004, Roof.
U.S. Appl. No. 11/000,168, filed Nov. 30, 2004, Biegelsen, et al.
U.S. Appl. No. 11/000,258, filed Nov. 30, 2004, Roof.
U.S. Appl. No. 11/001,890, filed Dec. 2, 2004, Lofthus, et al.
U.S. Appl. No. 11/002,528, filed Dec. 2, 2004, Lofthus, et al.
U.S. Appl. No. 11/051,817, filed Feb. 4, 2005, Moore, et al.
U.S. Appl. No. 11/070,681, filed Mar. 2, 2005, Viturro, et al.
U.S. Appl. No. 11,081,473, filed Mar. 16, 2005, Moore.
U.S. Appl. No. 11/069,020, filed Feb. 28, 2005, Lofthus, et al.
U.S. Appl. No. 11/089,854, filed Mar. 25, 2005, Clark, et al.
U.S. Appl. No. 11/090,498, filed Mar. 25, 2005, Clark.
U.S. Appl. No. 11/090,502, filed Mar. 25, 2005, Mongeon.
U.S. Appl. No. 11/095,378, filed Mar. 31, 2005, Moore, et al.
U.S. Appl. No. 11/094,998, filed Mar. 31, 2005, Moore, et al.
U.S. Appl. No. 11/094,864, filed Mar. 31, 2005, de Jong, et al.
U.S. Appl. No. 11/095,872, filed Mar. 31, 2005, Julien, et al.
U.S. Appl. No. 11/102,355, filed Apr. 8, 2005, Fromherz, et al.
U.S. Appl. No. 11/084,280, filed Mar. 18, 2005, Mizes.
U.S. Appl. No. 11/109,566, filed Apr. 19, 2005, Mandel, et al.
U.S. Appl. No. 11/109,558, filed Apr. 19, 2005, Furst, et al.
U.S. Appl. No. 11/109,996, filed Apr. 20, 2005, Mongeon, et al.
U.S. Appl. No. 11/093,229, filed Mar. 29, 2005, Julien.

U.S. Appl. No. 11/102,899, filed Apr. 8, 2005, Crawford, et al.
U.S. Appl. No. 11/102,910, filed Apr. 8, 2005, Crawford, et al.
U.S. Appl. No. 11/115,766, filed Apr. 27, 2005, Grace.
U.S. Appl. No. 11/102,332, filed Apr. 8, 2005, Hindi, et al.
U.S. Appl. No. 11/136,959, filed May 25, 2005, German, et al.
U.S. Appl. No. 11/136,821, filed May 25, 2005, Robinson.
U.S. Appl. No. 11/122,420, filed May 5, 2005, Richards.
U.S. Appl. No. 11/137,634, filed May 25, 2005, Lofthus, et al.
U.S. Appl. No. 11/137,251, filed May 25, 2005, Lofthus, et al.
U.S. Appl. No. 11/137,273, filed May 25, 2005, Anderson, et al.

* cited by examiner

COLOR CHARACTERIZATION OR CALIBRATION TARGETS WITH NOISE-DEPENDENT PATCH SIZE OR NUMBER

BACKGROUND

An imaging device, such as a printer or copier, typically creates images using combinations of four colors of marking agents or colorants, such as cyan, magenta, yellow and black (CMYK). The images are created based on image data which assigns at least one of the four colors and a numerical color intensity or input color value to each picture element or pixel in the image.

A problem is that, due to manufacturing variations, different imaging devices can output different intensities of color based on identical image data. The density of the toner laid down on the print medium determines the color intensity. The denser or thicker the toner is laid down on a white print medium such as paper, the less white is visible through the toner on the paper. Consequently, the denser the toner, the less the lightness of the toner color, and the greater the intensity of the toner color.

Because there is such variation in toner density laid down by different imaging devices based on identical image data, color intensities that are output by some imaging devices can be outside of an acceptable range. Thus, in order to ensure that each imaging device outputs color intensities that closely correspond to the color intensities specified by the image data, each imaging device should be individually calibrated to output appropriate color intensities.

By way of background, traditionally, calibrating printers (e.g. any apparatus, such as a digital copier, bookmaking machine, facsimile machine, multi-function machine, etc. which performs a print outputting function for any purpose) has proven to be a less-than-efficient task, particularly if large amounts of data (e.g. test patches) are used. Recently, scanners have been contemplated as an efficient mechanism to aid in the calibration process. Traditional printer calibration (that is, not using a scanner) typically has employed a densitometer or spectrophotometer, which includes an aperture typically around 5 mm in diameter, the reflected light that passes through that aperture is optically averaged by the device. Scanner based printer calibration has traditionally involved averaging the area in some region analogous to the aperture of a spectrophotometer or densitometer.

Scanner-based printer calibration requires scanning portions of printed pages, applying some image processing technique to obtain averages over small regions of the page, in analogy to the spectrophotometer aperture, and then converting the averaged signal to a device independent color space. To do this conversion, the scanner must itself be characterized. Calibration is a process that obtains the change required to the device signals required to restore the device behavior to its nominal state; characterization is a process that obtains the conversion from device signals to device independent signals in some standardized color space.

As alluded to above, color calibration is a process of measuring the device response to a known input and deriving a compensation for deviation from an "ideal" device. Calibration typically derives a one-dimensional correction function which is applied channel-wise through lookup tables. Calibration is typically applied to spectrophotometers and scanners in the form of white point calibration. A single measurement of a known white is used to compensate for instrument drift. Some scanners have a further calibration for black point variation. Printer calibration has traditionally been either in the form of linearizing individual channels (either in density or $\Delta E$ from paper) or in the form of grey balance. Grey balance calibration derives a set of one-dimensional correction functions for cyan, magenta and yellow, which when used in concert with equal inputs produce outputs that match a desired aim, such as $a^*=b^*=0$.

In a recent improvement, U.S. Publication No. 2004/0257595 A1 to Sharma et al. (filed Jun. 18, 2003 and bearing application Ser. No. 10/465,408), which is incorporated herein by reference in its entirety introduces a two-dimensional calibration scheme in which the correction function for a given separation depends not only on the input value of that separation, but also on a scalar function of the input values of the other separations. This method allows the calibration to provide the advantages associated with both grey balance and $\Delta E$ from paper, along with some improvements in portions of color space not controlled by those techniques.

The fundamental elements of color printer calibration are:
select a set of patches to print, typically being of one size;
print the patches;
measure the patches; and
derive a correction function.

The set of patches might change in an iterative process. The measurement might involve a spectrophotometer or similar instrument. The correction function is likely to depend on the nature of the calibration: grey balance, $\Delta E$ from paper, or 2D.

Color characterization is in principle a similar process to color calibration. It is used to derive a conversion function that is then applied to input data which is then sent to the "ideal" device as produced by applying the color calibration's correction function to the actual device. This conversion function maps device independent colors from some standardized space to colors appropriate for a corrected device. One common device independent space is $L^*a^*b^*$; another is standardized RGB.

At a high level, color characterization when applied to printers is the same as color printer calibration: one selects patches to print, prints and measures them, and derives a correction function. The difference is that the patches printed generally cover the gamut of the device more completely, and the correction function is normally multi-dimensional. Rather than deriving a set of scalar correction functions, a vector valued function is derived that maps three dimensional locations in color space to four dimensional printer values. This function is naturally more complex, and the derivation involves more computation, and generally requires more measured values to drive it.

Color characterization applied to scanners is only slightly different at a high level. Patches are printed on one or more printers, and measured using a well known and characterized measurement device, such as a spectrophotometer. The same patches are scanned and averaged and the correction function is derived to obtain a mapping from averaged values to values measured using the spectrophotometer. Improved results are obtained when a separate characterization is derived for each different printer type (esp. inkjet, photographic, lithographic and xerographic, but also different toner or ink sets), but average characterizations may also be derived for use when the printer type is unknown.

Given a characterized scanner, especially one characterized for a particular type of printer, that scanner may be used to characterize or calibrate an instance of that printer. In that case, the printer would generate the patches, the scanner would scan them, and they would be averaged and converted to device independent color space. From here on the process would follow the same pattern as for spectrophotometer based calibration or characterization, provided the algorithms used do not rely on the spectral data available from a spectrophotometer, and only rely on the L*a*b* values.

However, printers exhibit different amounts of noise depending on the level, as do scanners. Even noise in spectrophotometers appears to have some dependence on input level. Treating all levels equally leads to a compromise between over-measuring low-noise regions and under-measuring high noise regions. This disadvantage is realized where only a single size test patch is used in the calibration or characterization process. The variance resulting from analysis of such patches skews the results and leads to a less-effective calibration or characterization. An alternative is to use weighted least squares fitting to penalize bad fits in areas of more reliable data; however, this produces no guarantee that the fit will be any better in the high noise regions.

CROSS REFERENCE TO RELATED PATENTS AND APPLICATIONS

This application is related to U.S. Pat. No. 6,381,037 B1, issued Apr. 30, 2005.

The following applications, the disclosures of each being totally incorporated herein by reference are mentioned:

U.S. Provisional Application Ser. No. 60/631,651, filed Nov. 30, 2004, entitled "TIGHTLY INTEGRATED PARALLEL PRINTING ARCHITECTURE MAKING USE OF COMBINED COLOR AND MONOCHROME ENGINES," by David G. Anderson, et al.;

U.S. Provisional Patent Application Ser. No. 60/631,918, filed Nov. 30, 2004, entitled "PRINTING SYSTEM WITH MULTIPLE OPERATIONS FOR FINAL APPEARANCE AND PERMANENCE," by David G. Anderson et al.;

U.S. Provisional Patent Application Ser. No. 60/631,921, filed Nov. 30, 2004, entitled "PRINTING SYSTEM WITH MULTIPLE OPERATIONS FOR FINAL APPEARANCE AND PERMANENCE," by David G. Anderson et al.;

U.S. application Ser. No. 10/917,676, filed Aug. 13, 2004, entitled "MULTIPLE OBJECT SOURCES CONTROLLED AND/OR SELECTED BASED ON A COMMON SENSOR," by Robert M. Lofthus, et al.;

U.S. application Ser. No. 10/933,556, filed Sep. 3, 2004, entitled "SUBSTRATE INVERTER SYSTEMS AND METHODS," by Stan A. Spencer, et al.;

U.S. application Ser. No. 10/953,953, filed Sep. 29, 2004, entitled "CUSTOMIZED SET POINT CONTROL FOR OUTPUT STABILITY IN A TIPP ARCHITECTURE," by Charles A. Radulski et al.;

U.S. application Ser. No. 10/999,326, filed Nov. 30, 2004, entitled "SEMI-AUTOMATIC IMAGE QUALITY ADJUSTMENT FOR MULTIPLE MARKING ENGINE SYSTEMS," by Robert E. Grace, et al.;

U.S. application Ser. No. 11/000,168, filed Nov. 30, 2004, entitled "ADDRESSABLE FUSING AND HEATING METHODS AND APPARATUS," by David K. Biegelsen, et al.;

U.S. application Ser. No. 11/001,890, filed Dec. 2, 2004, entitled "HIGH RATE PRINT MERGING AND FINISHING SYSTEM FOR PARALLEL PRINTING," by Robert M. Lofthus, et al.;

U.S. application Ser. No. 11/002,528, filed Dec. 2, 2004, entitled "HIGH RATE PRINT MERGING AND FINISHING SYSTEM FOR PARALLEL PRINTING," by Robert M. Lofthus, et al.;

U.S. application Ser. No. 11/070,681, filed Mar. 2, 2005, entitled "GRAY BALANCE FOR A PRINTING SYSTEM OF MULTIPLE MARKING ENGINES," by R. Enrique Viturro, et al.;

U.S. application Ser. No. 11/081,473, filed Mar. 16, 2005, entitled "PRINTING SYSTEM," by Steven R. Moore;

U.S. application Ser. No. 11/084,280, filed Mar. 18, 2005, entitled "SYSTEMS AND METHODS FOR MEASURING UNIFORMITY IN IMAGES," by Howard Mizes;

U.S. application Ser. No. 11/090,502, filed Mar. 25, 2005, entitled IMAGE QUALITY CONTROL METHOD AND APPARATUS FOR MULTIPLE MARKING ENGINE SYSTEMS," by Michael C. Mongeon;

U.S. application Ser. No. 11/095,378, filed Mar. 31, 2005, entitled "IMAGE ON PAPER REGISTRATION ALIGNMENT," by Steven R. Moore, et al.;

U.S. application Ser. No. 11/109,558, filed Apr. 19, 2005, entitled "SYSTEMS AND METHODS FOR REDUCING IMAGE REGISTRATION ERRORS," by Michael R. Furst-etal;

U.S. application Ser. No. 11/109,996, filed Apr. 20, 2005, entitled "PRINTING SYSTEMS," by Michael C. Mongeon et al.;

U.S. application Ser. No. 11/115,766, Filed Apr. 27, 2005, entitled "IMAGE QUALITY ADJUSTMENT METHOD AND SYSTEM," by Robert E. Grace;

U.S. application Ser. No. 11/143,818, filed Jun. 2, 2005, entitled "INTER-SEPARATION DECORRELATOR", by Edul N. Dalal et al.;

U.S. application Ser. No. 11/146,665, filed Jun. 7, 2005, entitled "LOW COST ADJUSTMENT METHOD FOR PRINTING SYSTEMS", by Michael C. Mongeon; and, U.S. application Ser. No. 11/170,975, filed Jun. 30, 2005, entitled "METHOD AND SYSTEM FOR PROCESSING SCANNED PATCHES FOR USE IN IMAGE DEVICE CALIBRATION", by R. Victor Klassen.

INCORPORATION BY REFERENCE

U.S. Pat. No. 6,381,037 B1, issued Apr. 30, 2005, is hereby incorporated herein, in its entirety, by reference.

BRIEF DESCRIPTION

In one aspect of the presently described embodiments, a method comprises determining variances of average color values generated in a color space of an imaging device, generating test patches, each test patch having a size based on a variance, printing the test patches, measuring the test patches, and, performing a function based on the measurement.

In another aspect of the presently described embodiments, the imaging device is a printer.

In another aspect of the presently described embodiments, the performing comprises calibrating the printer.

In another aspect of the presently described embodiments, the performing comprises characterizing the printer.

In another aspect of the presently described embodiments, the imaging device is a scanner.

In another aspect of the presently described embodiments, the performing comprises calibrating the scanner.

In another aspect of the presently described embodiments, the performing comprises characterizing the scanner.

In another aspect of the presently described embodiments, the method is iterative.

In another aspect of the presently described embodiments, a method comprises determining variances of color values generated in a color space of an imaging device, determining a number of test patches to be printed based on the variances, printing the test patches, measuring the test patches, and, performing a function based on the measurement.

In another aspect of the presently described embodiments, the imaging device is a printer.

In another aspect of the presently described embodiments, the performing comprises calibrating the printer.

In another aspect of the presently described embodiments, the performing comprises characterizing the printer.

In another aspect of the presently described embodiments, the imaging device is a scanner.

In another aspect of the presently described embodiments, the performing comprises calibrating the scanner.

In another aspect of the presently described embodiments, the performing comprises characterizing the scanner.

In another aspect of the presently described embodiments, the method is iterative.

In another aspect of the presently described embodiments, a system comprises a processor operative to determine variances of average color values generated in a color space of an imaging device and determining one of test patches having a size based on the variances or a number of test patches to be printed based on the variances, and performing of the function based on a measurement of the test patches, a printing device operative to print the test patches, and, a scanning device operative to measure average color values of the test patches.

In another aspect of the presently described embodiments, the processor is operative to perform a calibration.

In another aspect of the presently described embodiments, the processor is operative to perform a characterization.

In another aspect of the presently described embodiments, the imaging device is a printer.

In another aspect of the presently described embodiments, the imaging device is a scanner.

DETAILED DESCRIPTION

As noted above, noise associated with a particular imaging device, such as a printer or a scanner, is an obstacle and preferably reduced or eliminated when calibrating such devices. However, it should be understood that it is well known that printers are more noisy in some areas of color space than other areas of color space. For example, a printer is generally not noisy at all in white space and has increased noise in other areas of the color space such as where there is a full breakdown between color separations. The areas having the most noise are typically those with partial color separations therein.

Likewise, scanners have some predictability with respect to noise. For example, scanners are less noisy if exposed to greater amounts of light.

As such, it is possible to derive equations or fit calibration curves to predict the particular noise patterns of a printer or a scanner. Indeed, such equations or curves can even be developed to accommodate a printer and scanner combination.

In accord with the presently described embodiments, it should be understood that it is desirable to collect more data for calibration in areas where more noise is predicted for the particular imaging device being used.

To do so, the number of repeated patches or the size of a patch of a given color is printed to be approximately proportional to the square of the expected noise level. In that way, when multiple measurements for a given patch are averaged, all patch averages have approximately the same reliability. The expected noise level may be derived from a model of scanner behavior (if the patches are to be measured with a scanner), or from a model of printer noise. After initial measurements, noise levels from previous measurements may be used rather than model-based estimates.

It should be further understood that the use of patches according to the presently described embodiments may be used to calibrate a printer, whether a spectrophotometer or scanner is used. These techniques are also useful to characterize, or calibrate, a scanner. However, for ease of explanation, an architecture environment will be described where a printer prints the test patches, and a scanner is used to aid in the calibration process. Indeed, the implementation of test patches having a varying size is particularly advantageous in this environment. Prior to the use of scanners in calibration, there was little or no need to vary patch sizes because spectrophotometers have a limited viewing range (e.g. such devices only analyze one spot) during analysis. However, spectrophotometer based calibration can still use averages of multiple patches to reduce noise.

Figure 1:
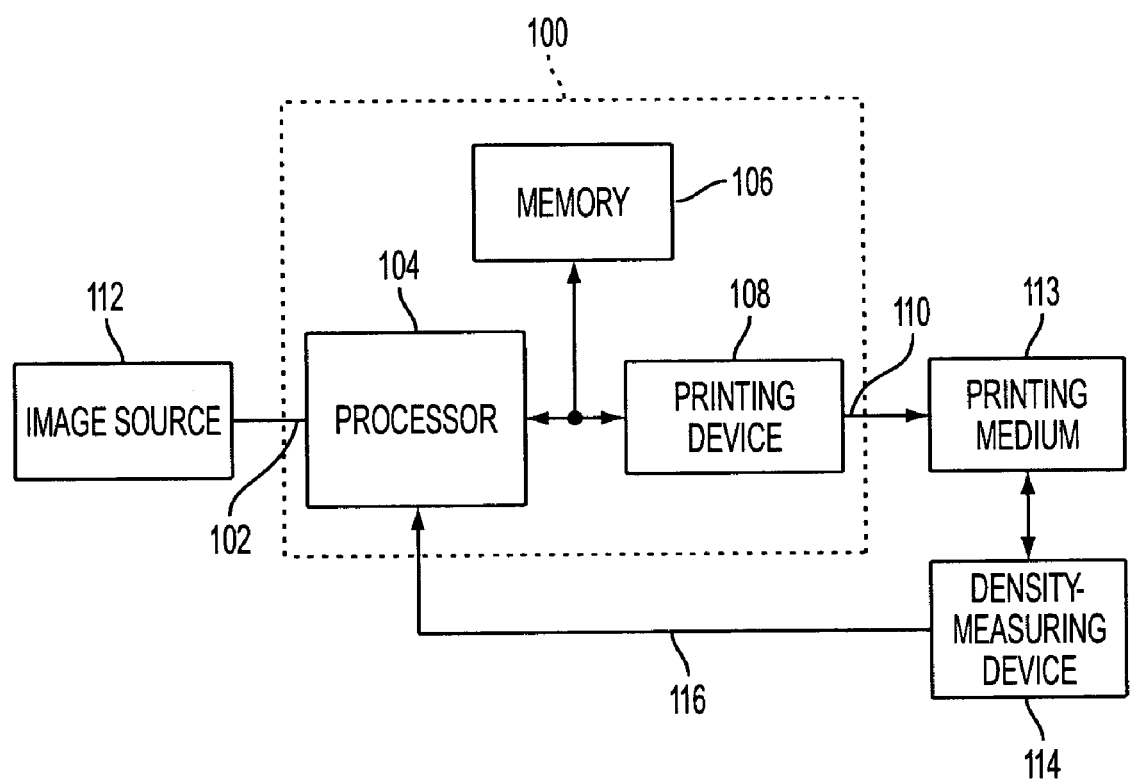
FIG. 1 illustrates a system into which the presently described embodiments may be implemented.

Along these lines, FIG. 1 shows a system that prints test patches, measures color output values of the test patches, and calibrates the color output characteristics of the system based upon the measured color output values. The system includes an arrangement 100 according to the presently described embodiments, an image source 112, a print medium 113, and a color-measuring device 114.

The arrangement 100 includes an input 102, a processor 104, a memory 106, a printing device 108, and an output 110. In general, the arrangement receives at the input 102 an image and generates at the output 110 printed pages of recording media from which the image may be physically reconstructed.

The image source 112 can be any suitable device that generates image data corresponding to a two-dimensional image. The image source 112 is further configured to provide image data corresponding to an array of rows and columns of test patches that are used to calibrate the arrangement 100, as will be discussed in more detail below. To this end, the image source 112 can be a general purpose computer that generates printable output data, such as that generated using charting software, presentation software, computer-aided design software, and the like. In other words, the data can be generated as a software output file. Alternatively, the image source 112 can be in the form of a processor that can be found, for example, in a color copier. Such a processor can be either separate from or integral with the processor 104. It will be appreciated that the image source 112 can in some cases be a software routine that is performed by the processor 104. For example, the software routine can output a sequence of colors and input color values with which test patches are to be produced by the printing device 108. However, typically, the image source 112 will be a separate device that may or may not include other processors. The image source can possibly provide the image data in any color space, including CMYK, RGB, CIELAB, etc.

Referring now to the arrangement 100 according to the presently described embodiments, the processor 104 is a controller, microprocessor, microcontroller, programmable digital logic circuit, or other processing device, that is operable to, among other things, generate color input values in CMYK color space that correspond to the image data received from the image source 112. In most cases, the CMYK color input values will be generated by the processor 104 with the intent of causing the printing device 108 to produce an output 110 that is an accurate visual manifestation of the image data that is contained in the input 102.

The printing device 108 is a device that is operable to print the image information from the processor 104 and/or the memory 106 onto a recording medium or print medium. To this end, the printing device 108 may be an ink jet printer, a laser printer, a xerographic printing device, or other printing device that is operable to print to a recording medium based on pixel data in scan line or raster format. The printing device 108 typically uses marking agents, such as ink or toner, which can be available in four colors, such as cyan, magenta, yellow and black.

In order that the printing device 108 can achieve the many shades of color in the input color values with only the four colors of marking agents at its disposal, the processor 104 may transform the input color values into halftoned pixel data, as is well known in the art. Accordingly, the processor 104 in this embodiment is operable to translate the CMYK input color values calculated by the processor into halftone pixel data that can be stored in the memory 106. The processor 104 is also operable to coordinate the transfer of the halftone pixel data from the memory 106 to the printing device 108. To this end, it will be appreciated that the processor 104 as depicted herein can include one device or several devices that perform the various processing steps described above.

The color-measuring device 114 receives the output of the printing device 108 that is printed on a print medium 113, such as paper. In accordance with one of the presently described embodiments, the device is a color-measuring device 114 in the form of a light sensor that measures the color output values of an array of rows and columns of test patches that are printed on one or more sheets of paper by the printing device 108. The color-measuring device 114 generally emits light onto each of the test patches and measures an amount of light that is reflected off of the patch and back to the color-measuring device. The darker the test patch, the less light that is reflected back to the color-measuring device 114. The color-measuring device 114 transmits a signal 116 to the processor 104. The signal 116 indicates the output color values measured for each of the test patches. The color-measuring device 114 can include a light-emitting diode (LED) to emit light onto the patches, and a photosensitive diode to sense the amount of light being reflected off of the patches. If in the form of a scanner, the color-measuring device 114 can contain document illumination lamps, optics, a mechanical scanning drive, and a charge coupled device (CCD array) or full width color scanning array.

Although the color-measuring device can be attached to the arrangement 100, it is more typical for the color-measuring device 114 to be separate from the arrangement 100. More particularly, the color-measuring device 114 can be provided in the factory where the imaging device 100 is manufactured. In this case, the color-measuring device 114 can be used to calibrate the output of the imaging device 100 before the imaging device 100 leaves the factory. Alternatively, or additionally, the color-measuring device 114 can be provided at the facility where the imaging device 100 operates in order to occasionally calibrate the output of the imaging device 100 over the course of its useful life.

Figure 2:
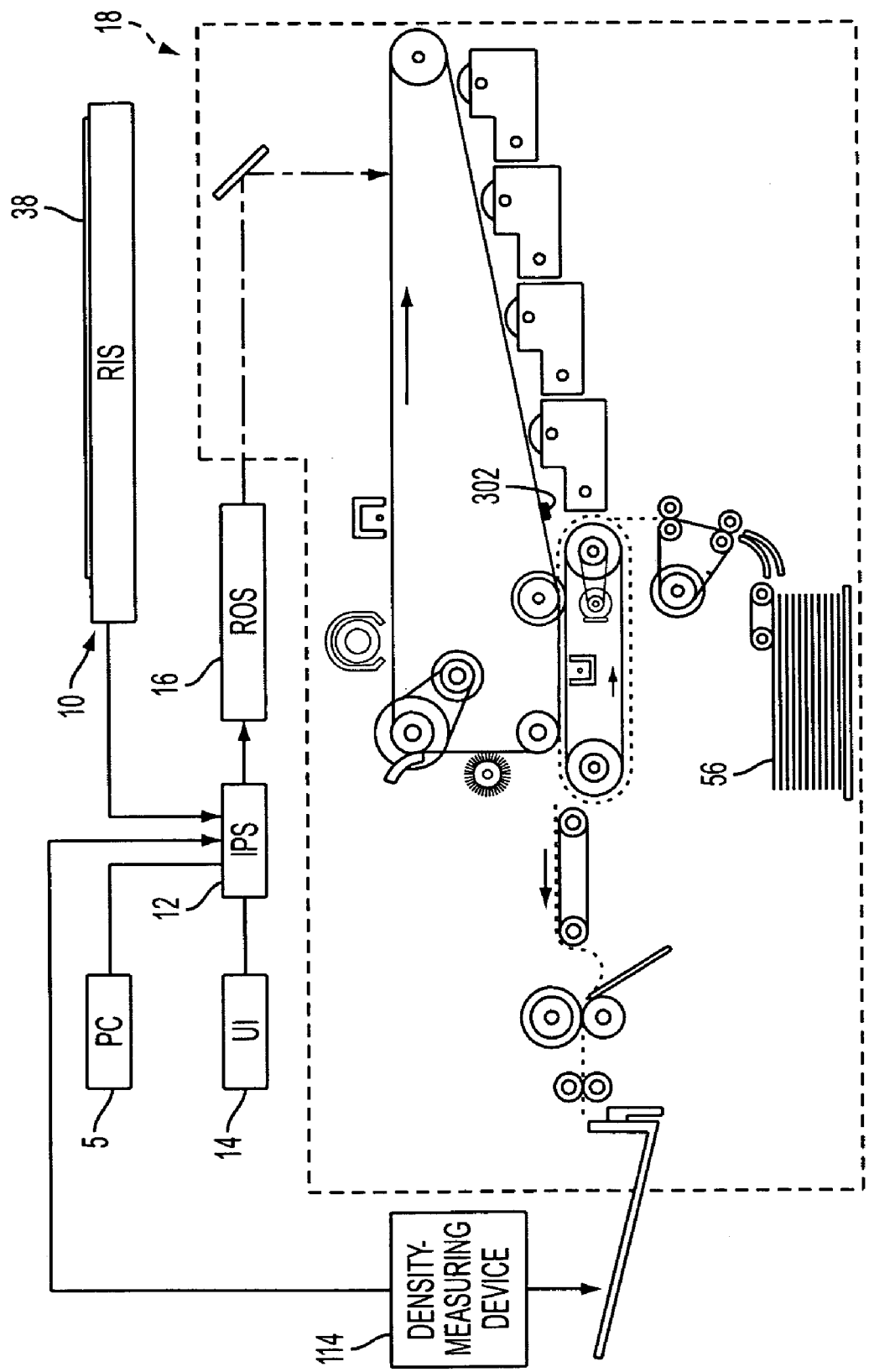
FIG. 2 is a system into which the presently described embodiments may be implemented.

FIG. 2 shows an illustrative embodiment of a printing machine that incorporates aspects of the presently described embodiments. FIG. 2 is a schematic elevational view showing an illustrative electrophotographic printing machine and a networked PC which may incorporate features of the presently described embodiments therein. As discussed above, however, it will become evident from the following discussion that embodiments of the presently described embodiments are equally well suited for use in a wide variety of printing and copying systems, and therefore are not limited in application to the particular system(s) shown and described herein.

The illustrative electrophotographic printing machine of FIG. 2 is operable to print on recording media images that are generated when an input manuscript is scanned. To begin by way of general explanation of the machine of FIG. 3, an image processing station (IPS), indicated generally by the reference numeral 12, contains data processing and control electronics which prepare and manage the image data flow to a raster output scanner (ROS), indicated generally by the reference numeral 16. A network of one or more personal computers (PC), indicated generally by the reference numeral 5, is shown interfacing/in communication with the IPS 12. A user interface (UT), indicated generally by the reference numeral 14, is also in communication with the IPS 12.

The UI 14 enables an operator to control and monitor various operator-adjustable functions and maintenance activities. The operator actuates the appropriate keys of the UI 14 to adjust the parameters of the copy. The UI 14 may be a touch screen, or any other suitable control panel, providing an operator interface with the system. The output signal from the UI 14 is transmitted to the IPS 12. The UI 14 may also display electronic documents on a display screen (not shown in FIG. 2).

As further shown in FIG. 2, a multiple color original document 38 may be positioned on a raster input scanner (RIS), indicated generally by the reference numeral 10. The RIS 10 contains document illumination lamps, optics, a mechanical scanning drive, and a charge coupled device (CCD array) or full width color scanning array. The RIS 10 captures the entire image from the original document 38 and converts it to a series of raster scan lines and moreover measures a set of primary color densities, i.e., red, green and blue densities, at each point of the original document. The RIS 10 may provide data on the scanned image to the FPS 12, indirectly to the PC 5 and/or directly to the PC 5.

Digitized electronic documents may be created, modified, stored and/or otherwise processed by the PC 5 prior to transmission/relay to the IPS 12 for printing on a printer or marking engine, indicated generally by the reference numeral 18. The display of the PC 5 may show electronic documents on a screen (not shown in FIG. 2). In the embodiment described herein, the IPS 12 includes the processor(s), controller(s), and/or other circuits (not shown in FIG. 2) required to perform the operations ascribed to the processor 104 of FIG. 2. Nevertheless, in an alternative embodiment, the operations of the processor 104 of FIG. 1 may be carried out within the PC 5.

The IPS 12 also transmits signals corresponding to the desired electronic or scanned image to the marking element, which creates the output copy image, using methods not material to the presently described embodiments. The marking element causes more or less of the various colorants (ink or toner) to be deposited and/or affixed to the paper according to the strengths of the signals it receives.

Typically, in color printing, there are four signals, one for each of yellow, magenta, cyan and black. Each of the signals controls how much of a corresponding colorant is deposited on the paper. The amount of the corresponding colorant controls how much light is reflected and how much is absorbed in part of the spectrum. For example, the amount of yellow colorant controls how much blue light is reflected, because yellow colorant has a yellow appearance due to absorbing blue and reflecting other colors. To produce a green appearance, yellow and cyan colorants are used in combination to absorb both blue and red, leaving only light in the green portion of the spectrum.

Figure 3:
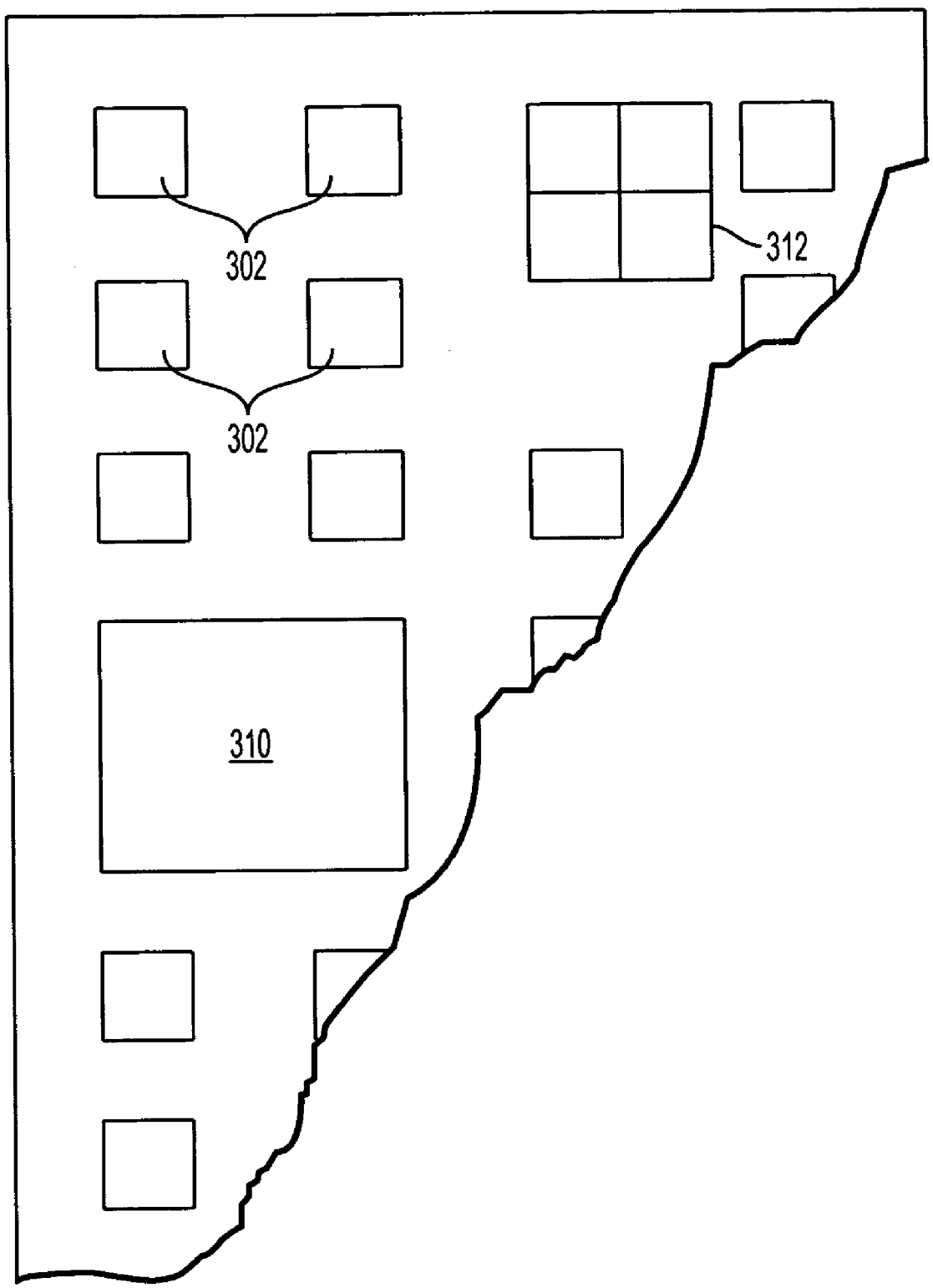
FIG. 3 is an illustration of test patches printed.

With reference to FIG. 3, the printer 18 (or printing device 108) produces an array of test patches 302 on a sheet 56. The color-measuring device or scanner 114 measures the density of the test patches 302. The color-measuring device 114 transmits the measurement data to the IPS 12. The IPS 12 then uses the measurement data to conduct calculations based on a calibration method that may be used.

According to the presently described embodiments, the test patches that are used are of a varying size. An example of this is shown at 310 in FIG. 3. In that case, the test patch 310 is approximately three (3) times larger, in each dimension, than the other patches 302.

The varying size is advantageous because it allows for more data to be measured for a given area where additional noise is likely to be present. This allows for less variance between test patches and, ultimately, allows for a better calibration or characterization. A common way of reducing the impact of the noise in measured data is to average many measurements together. When N measurements of noisy data are averaged, and it is safe to assume that the samples are taken from an integrable distribution, it is straightforward to show that the standard error of the mean s is given by the standard deviation of the underlying distribution $\sigma$ divided by the square root of N. That is to say, if N new measurements were to be averaged, and the process repeated many times, the standard deviation of the averages thus obtained would asymptotically approach $\sigma N^{-1/2}$. When fitting noisy data to a model, it is better to average more data points where the data is noisier, and the number should be proportional to an estimate of $\sigma^2$, the variance.

Of course, since the underlying objective is to calculate more data for test patches where noise is present, more test patches could be printed in a particular area instead of varying the size of one particular test patch. As representatively shown, a group 312 of test patches is illustrated.

Figure 4:
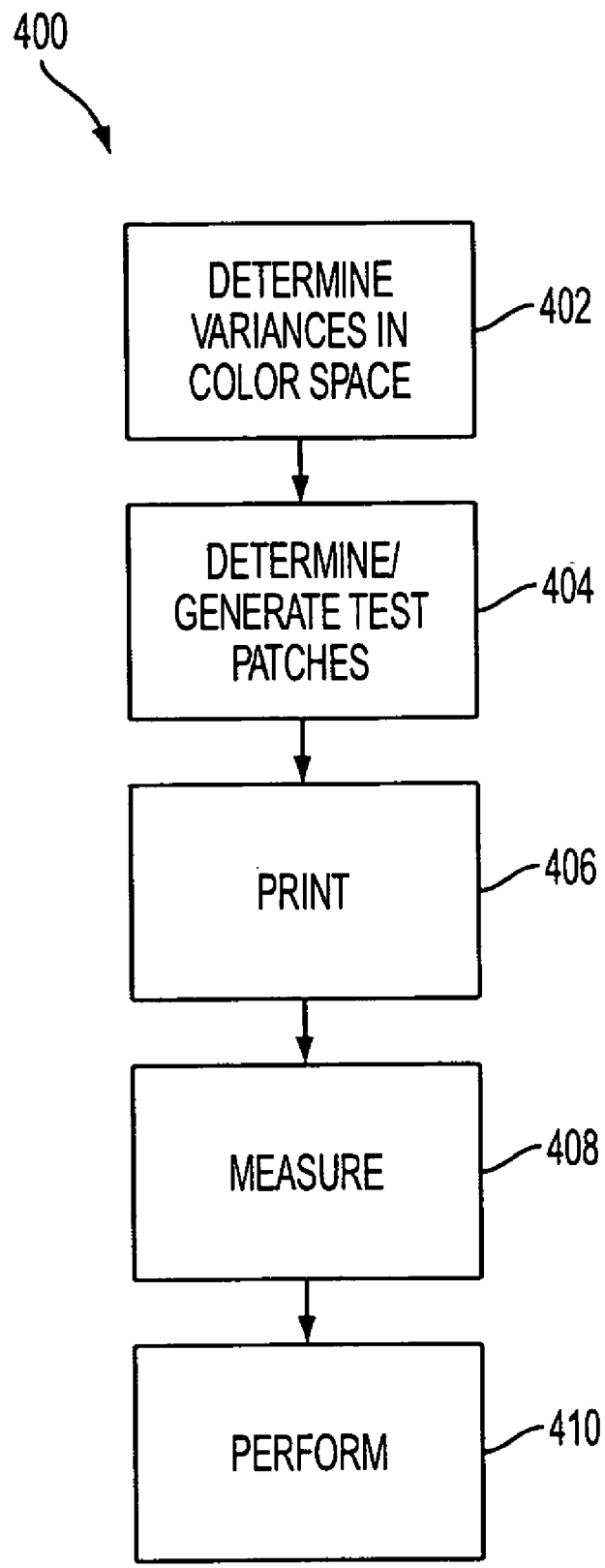
FIG. 4 is a flow chart illustrating a method according to the presently described embodiments.

Either technique falls within the scope of the presently described embodiments. In this regard, using the systems described above in connection with FIGS. 1-3, and others, a method according to the presently described embodiments is shown in FIG. 4. This method may be implemented within the imaging device as one or more software routines stored and run in suitable locations (e.g. the processor or image processing unit of a printer). Appropriate hardware configurations are also provided, where necessary. In this regard, it should be understood that the presently described embodiments may, where appropriate, be implemented in software routines, and suitable hardware configurations, to perform the functions described herein by the elements described. Of course, software routines may be distributed among the elements (e.g. a scanner, a processor, an imaging processing station, a PC, . . . etc.) or, if suitable, may be centralized in a convenient location. For example, in one form, software routines implementing the presently described embodiments may be implemented in the image processing station (IPS) 12 of FIG. 2, or the processor 104 of FIG. 1.

As shown, a method 400 is initiated by determining variances of average color values generated in a color space of an imaging device (at 402). This determination can be accomplished in a number of manners. For example, software routines could be run within the imaging device itself to make these determinations. Alternatively, manufacturing data and experimental data could be used to determine these variances in the average measured color values. Suitable equations may be developed or curves fit to accomplish this task, which will vary from application to application. In any event, these determinations allow for predictions as to the amount of noise generated in particular areas of color space of an imaging device. Moreover, the imaging device may be a printer or a scanner. In this regard, the ultimate functions to be performed may be calibration or characterization.

Once the variances are determined, test patches are generated having sizes based on the variances (at 404). Again, the size of the test patch will be larger where increased noise levels are predicted to be present. In this regard, specific mathematical relationships can be manipulated to achieve these objectives. For example, the size of the test patches may be made such that the width and height of the patch are proportional to the standard deviation of the variances within the area of the color space corresponding to the patch. For example, if the standard deviation in a first region of the color space is one and the standard deviation in a second region is three, the test patches used in connection with the second region should be made three times the size, in each direction, of the first region. This will mean that the variances of the average of the values measured in the second region will be ⅑ as large (as they would have been with the original size), so the standard deviation will be ⅓ as large. As such, the standard deviation for the averages of the second region will also be one. This allows for improved processing because the standard deviations are similar. Therefore, calibration and characterization can be more effectively pursued.

Once the test patches are generated, they are printed (at 406). In systems such as those above, the printing occurs within the system. However, if a calibration or characterization of a scanner is performed, the printing does not necessarily need to be accomplished within the same system.

Typically, after the printing of the test patches, the average color values of the test patches are measured (at 408). As will be clearly understood by those of skill in the art, the values measured may be any of a variety of useful color values. For example, luminance may be measured.

Next, a function is performed based on the measuring of the test patches (at 410). As noted above, this function may comprise calibration, or characterization. Moreover, the process described herein may be an iterative process calling for a constant recalculation and reassessment of the size of the test patches. Alternatively, a finite number of test patch sizes may be used within the system. This alternative is most advantageous where predictability of printer or scanner noise is more stable.

The experimental bases and analysis of the process described in connection with FIG. 4 will be described below.

Figure 5:
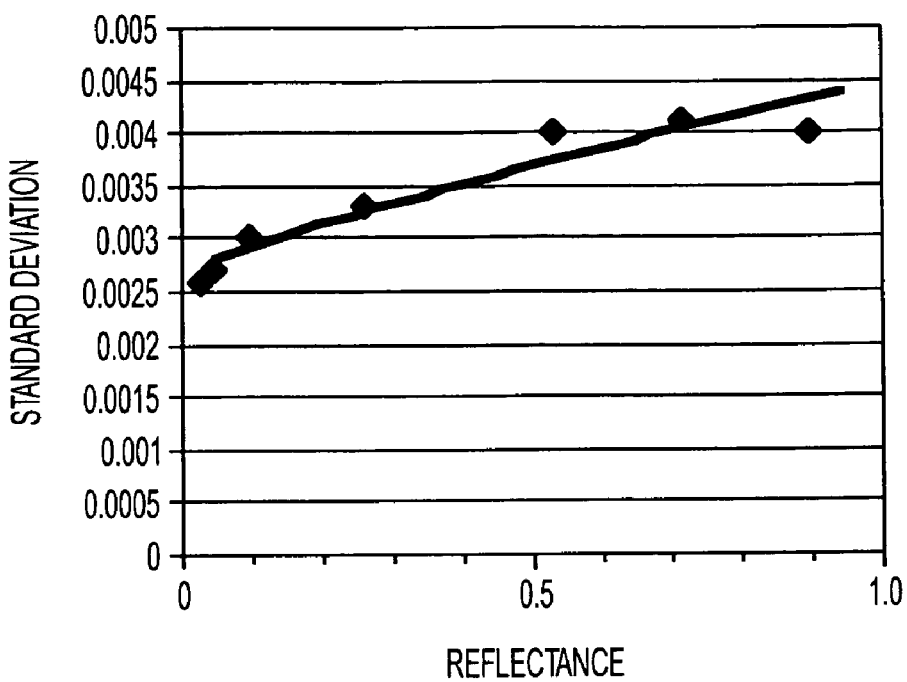
FIG. 5 is a graphic illustration illustrating and/or explaining features of the presently described embodiments.

As alluded to above, measurement noise is correlated with the location in color space. This is true both of printer-induced noise, and scanner noise. It is less the case for spectrophotometer measurement noise. FIG. 5 shows the noise characteristic of the red channel on a typical scanner. The solid line shows a theoretical fit to the data. Note that the units are in reflectance; in 8 bit scanner space, the 0.005 corresponds to 1.275.

Figure 6:
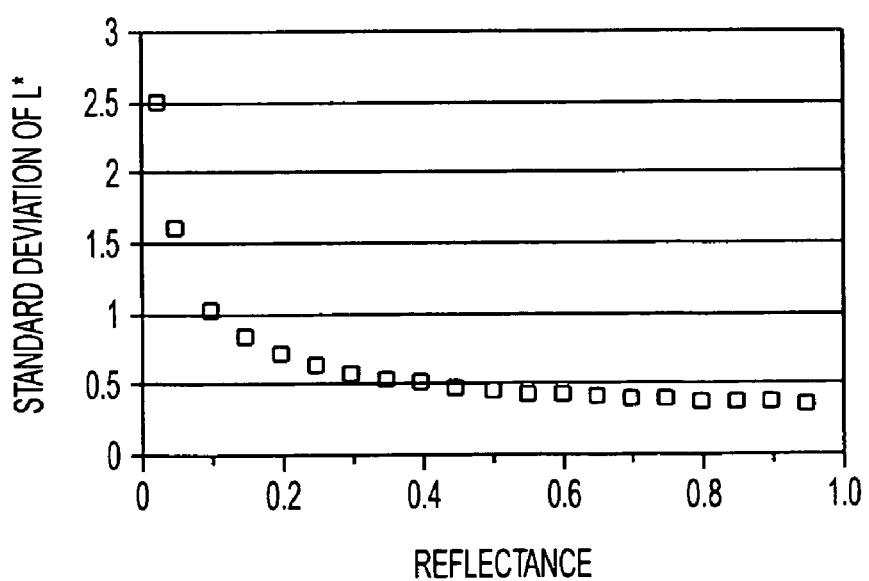
FIG. 6 is a graphic illustration illustrating and/or explaining features of the presently described embodiments.

A more instructive way to look at the data is in L*a*b* space, which is more visually uniform. For grey data, this is equivalent to using L*. FIG. 6 (the theoretical fit of FIG. 5, converted to units of L*) shows the width of the +/− one standard deviation window in units of L* as a function of reflectance. While the standard deviation in units of reflectance increases with reflectance, when expressed in units of L*, it decreases with increasing reflectance. At small reflectances, corresponding to small values of L*, relatively small changes in reflectance correspond to relatively large changes in L*.

Figure 7:
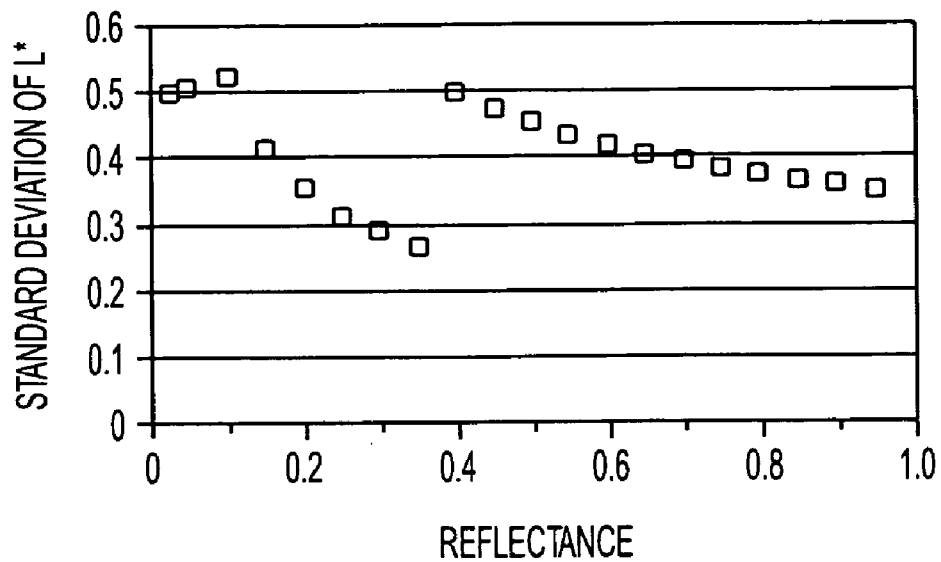
FIG. 7 is a graphic illustration illustrating and/or explaining features of the presently described embodiments.

If either the number of patches or the size of the patches is increased at the low end of the reflectance scale, it is possible to make the L* noise behavior much closer to constant. Suppose, for example, the patches to be measured correspond to the squares in FIG. 6. If the first patch is replaced by a 5×5 grid of patches, and the second by 10 patches, the third through the $8^{th}$ by 4 patches, the noise behavior improves considerably, as shown in FIG. 7. It is always lower than 0.53, and falls within a window of 0.34 to 0.53. In this way, any desired bound on the noise may be obtained, at the possible expense of printing and measuring arbitrarily large or numerous patches. Thus, increasing the patch count at low reflectances improves the uniformity of errors.

Figure 8:
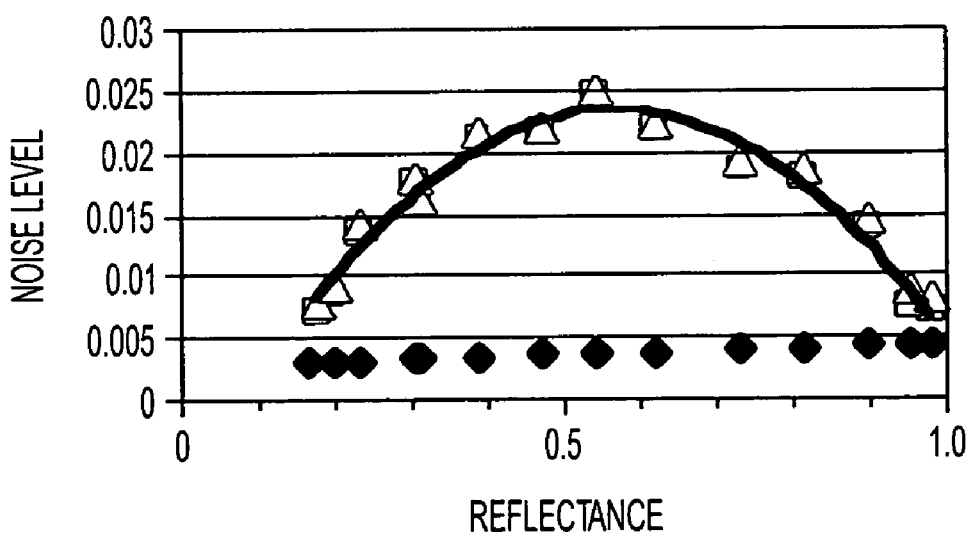
FIG. 8 is a graphic illustration illustrating and/or explaining features of the presently described embodiments; and, FIG. 9 is a graphic illustration illustrating and/or explaining features of the presently described embodiments.

In practice, printer noise is also a factor. Printer noise depends primarily on the level of each of the separations present. If the printer noise behavior is known from prior measurements, this may be added to the scanner noise behavior before computing the patch size or number—i.e. the number of measurements to take for that level. FIG. 8 shows the combined printer and scanner noise, as measured from actual patches of a black (K separation) step wedge printed on a Xerox Phaser 7700 laser printer and scanned. The diamonds represent scanner noise, the triangles represent measured noise and the squares represent derived printer noise. The combined noise was measured to calculate the standard deviation of the pixels within the patch; the printer noise is the difference between the combined (measured) values and the calculated scanner noise. (Both the scanner and combined values are converted to variances, the variances subtracted, and the result converted to a standard deviation). The printer noise is well fit by a quadratic. If no data is available, printer noise can be assumed 0 at 0 and unit reflectance, with a maximum based on other similar printers at 50% reflectance.

Figure 9:
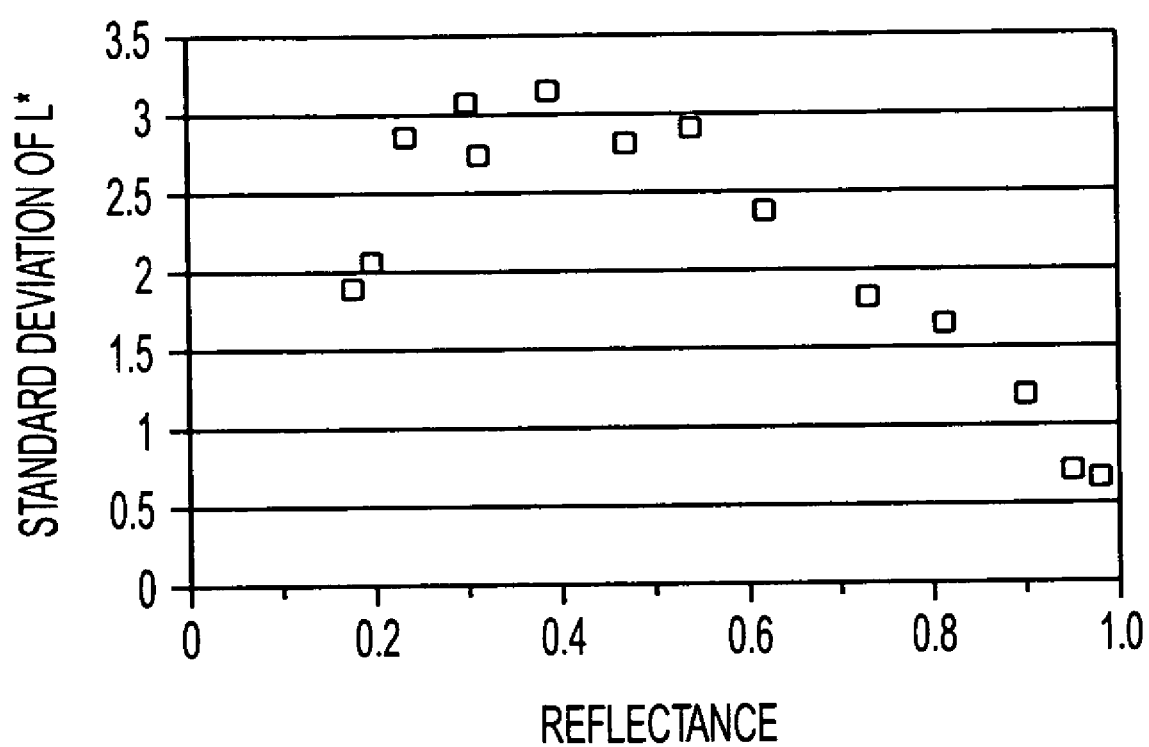

Again, while reflectance space is good for data fitting, it is noise in L* that really matters. FIG. 9 shows the combined printer/scanner noise in L* space. So, when expressed in L*, the combined noise data shows a peak in the low mid-tones.

From a practical point of view, only a small number of sizes are needed, in order to bring all of the noise levels within a reasonable (say factor of two) range. The measurement area for a given color should be proportional to the anticipated noise level. This may be done by increasing the size of the patch or by increasing the number of patches.

If the patches are to be measured using a spectrophotometer (as in a spectrophotometer-based printer characterization or calibration, or a scanner characterization), there is less advantage to using variable sized patches; multiple patches are just as useful. If the patches are to be scanned only (as for a scanner based printer calibration or characterization), variable sized patches have the advantage of having less perimeter per unit area. In a scanner based calibration or characterization, pixels near the edge of a patch are discarded in the calculation in order to reduce any edge effects.

An advantageous number of measurements per color—which translates to the total area of the patches of that color—is proportional to the anticipated variance in the measurements of that color. The area for a given color is then the variance anticipated for that color times the total area available, divided by the sum of the anticipated variances for all colors to be measured. To compute the anticipated variance for a color, the variances of the participating separations should be added, giving an estimated print variance. To the print variance, a scan variance must be added.

To compute the scanner variance, an estimated RGB value must be computed from the CMYK value of the patch. This may be based on a prior printer characterization, or based on a similar printer. From this estimated RGB a variance in each of R, G and B may be computed using a theoretical model of scanner noise, or a fit to actual data. These three variances, along with the expected RGB, define an ellipsoid in RGB space. From a sampling of the points on the ellipsoid, each converted to L*a*b*, one may fit an ellipsoid in L*a*b* space. The length of the longest axis is the figure of merit for determining the number or size of patches.

The complex approach described above is only useful for boot-strapping. In all three applications discussed above: scanner and printer characterization, and printer calibration, good estimates of the variance are often available from prior measurements. For scanner characterization, the scanner noise itself is small enough that combined noise from a print made on the same printer measured on a similar scanner provides a good approximation. For printer characterization, noise measured from a print on a similar printer provides a good start. For printer calibration, noise measured on a previous calibration or on the characterization is generally better than a calculated estimate.

As an alternative, two scans may be made, one of a page with equal sized patches of all colors to be measured, and one with variable sized patches. The first scan would be used only to calculate variances, and hence patch sizes.

Another application is iterative calibration, in which a subset of the colors are printed and measured at each iteration, and these are combined in some way with previous measurements to obtain the new correction. An advantage to this approach is that fewer patches may be needed on each iteration, and changes to the color correction function are gradual. In this application it is not necessarily the number of repetitions of a given color on a single page that is increased, but instead, the frequency with which a given color is revisited on subsequent iterations is in proportion to the variance experienced in the history of measurements of that color. This applies both to systems using a scanner to measure and to densitometer-based measurements.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The claims can encompass embodiments in hardware, software, or a combination thereof.

The invention claimed is:

1. A method comprising:
   determining variances of average color values generated in a color space of an imaging device;
   generating test patches, each test patch having a size based on a determined variances, the size being proportional to a standard deviation of the determined variances;

printing the test patches;

measuring the test patches using a color measuring device; and, performing a function based on the measurement.

2. The method as set forth in claim 1 wherein the imaging device is a printer.

3. The method as set forth in claim 2 wherein the performing comprises calibrating the printer.

4. The method as set forth in claim 2 wherein the performing comprises characterizing the printer.

5. The method as set forth in claim 1 wherein the imaging device is a scanner.

6. The method as set forth in claim 5 wherein the performing comprises calibrating the scanner.

7. The method as set forth in claim 5 wherein the performing comprises characterizing the scanner.

8. The method as set forth in claim 1 wherein the method is iterative.

9. A method comprising:

determining variances of color values generated in a color space of an imaging device;

determining a number of test patches to be printed based on the determined variances, the number of test patches being proportional to a standard deviation of the determined variances;

printing the test patches;

measuring the test patches using a color measuring device; and, performing a function based on the measurement.

10. The method as set forth in claim 9 wherein the imaging device is a printer.

11. The method as set forth in claim 10 wherein the performing comprises calibrating the printer.

12. The method as set forth in claim 10 wherein the performing comprises characterizing the printer.

13. The method as set forth in claim 9 wherein the imaging device is a scanner.

14. The method as set forth in claim 13 wherein the performing comprises calibrating the scanner.

15. The method as set forth in claim 13 wherein the performing comprises characterizing the scanner.

16. The method as set forth in claim 10 wherein the method is iterative.

17. A system comprising:

a processor operative to determine variances of average color values generated in a color space of an imaging device and determining one of test patches having a size based on the determined variances or a number of test patches to be printed based on the determined variances, and performing of the function based on a measurement of the test patches;

a printing device operative to print the test patches, wherein the size or number of test patches is proportional to a standard deviation of the determined variances; and, a scanning device operative to measure average color values of the test patches.

18. The system as set forth in claim 17 wherein the processor is operative to perform a calibration.

19. The system as set forth in claim 17 wherein the processor is operative to perform a characterization.

20. The system as set forth in claim 17 wherein the imaging device is a printer.

21. The system as set forth in claim 17 wherein the imaging device is a scanner.

* * * * *